(12) United States Patent
Igarashi et al.

(10) Patent No.: US 10,519,303 B2
(45) Date of Patent: Dec. 31, 2019

(54) RESIN COMPOSITION CONTAINING ETHYLENE/VINYL ALCOHOL COPOLYMER, LAMINATE, AND MOLDED ARTICLE

(71) Applicant: KURARAY CO., LTD., Kurashiki-shi (JP)

(72) Inventors: Takeyuki Igarashi, Okayama (JP); Wataru Hirose, Kurashiki (JP)

(73) Assignee: KURARAY CO., LTD., Kurashiki-shi (JP)

( * ) Notice: Subject to any disclaimer, the term of this patent is extended or adjusted under 35 U.S.C. 154(b) by 12 days.

(21) Appl. No.: 15/773,183

(22) PCT Filed: Nov. 2, 2016

(86) PCT No.: PCT/JP2016/082648
§ 371 (c)(1),
(2) Date: May 3, 2018

(87) PCT Pub. No.: WO2017/078089
PCT Pub. Date: May 11, 2017

(65) Prior Publication Data
US 2018/0327578 A1    Nov. 15, 2018

(30) Foreign Application Priority Data
Nov. 4, 2015   (JP) ................. 2015-217057

(51) Int. Cl.

| | | |
|---|---|---|
| *B32B 27/28* | (2006.01) | |
| *C08L 23/08* | (2006.01) | |
| *C08K 3/26* | (2006.01) | |
| *C08L 23/22* | (2006.01) | |
| *B65D 1/00* | (2006.01) | |
| *C08L 53/00* | (2006.01) | |
| *B65D 1/02* | (2006.01) | |
| *B32B 27/30* | (2006.01) | |
| *B32B 27/32* | (2006.01) | |
| *C08L 29/04* | (2006.01) | |
| *C08L 53/02* | (2006.01) | |

(52) U.S. Cl.
CPC ............. *C08L 23/08* (2013.01); *B32B 27/28* (2013.01); *B32B 27/302* (2013.01); *B32B 27/306* (2013.01); *B32B 27/32* (2013.01); *B65D 1/00* (2013.01); *B65D 1/02* (2013.01); *C08K 3/26* (2013.01); *C08L 23/22* (2013.01); *C08L 29/04* (2013.01); *C08L 53/00* (2013.01); *C08L 53/02* (2013.01); *B32B 2439/00* (2013.01); *C08L 2201/14* (2013.01); *C08L 2203/16* (2013.01); *C08L 2203/30* (2013.01)

(58) Field of Classification Search
USPC ......................................................... 428/483
See application file for complete search history.

(56) References Cited

U.S. PATENT DOCUMENTS

| | | |
|---|---|---|
| 5,895,797 A | 4/1999 | Hayashihara et al. |
| 6,028,147 A | 2/2000 | Ogawa et al. |
| 2006/0167156 A1 | 7/2006 | Fukuda et al. |

FOREIGN PATENT DOCUMENTS

| | | |
|---|---|---|
| JP | 10-1579 | 1/1998 |
| JP | 10-110086 | 4/1998 |
| JP | 10-237299 | 9/1998 |
| JP | 11-100420 | 4/1999 |
| JP | 2000-157627 | 6/2000 |
| JP | 2004-203922 | 7/2004 |
| JP | 2006-131774 | 5/2006 |
| WO | WO 2004/024825 A1 | 3/2004 |

OTHER PUBLICATIONS

International Search Report dated Dec. 6, 2016 in PCT/JP2016/082648, filed Nov. 2, 2016.

*Primary Examiner* — Terressa Boykin
(74) *Attorney, Agent, or Firm* — Oblon, McClelland, Maier & Neustadt, L.L.P.

(57) ABSTRACT

Provided is a resin composition, comprising: an ethylene-vinyl alcohol copolymer (A); an isobutylene-based copolymer (B) containing a halogen atom; and a halogen scavenger (C), wherein a mass ratio (B/A) of the isobutylene-based copolymer (B) to the ethylene-vinyl alcohol copolymer (A) is from 5/95 to 45/55, and a content of the halogen scavenger (C) is from 0.01 to 1 part by mass based on 100 parts by mass of a total of the ethylene-vinyl alcohol copolymer (A) and the isobutylene-based copolymer (B). Such a resin composition is excellent in gas barrier properties and flexibility and stably produced over a long period of time.

13 Claims, No Drawings

RESIN COMPOSITION CONTAINING ETHYLENE/VINYL ALCOHOL COPOLYMER, LAMINATE, AND MOLDED ARTICLE

TECHNICAL FIELD

The present invention relates to a resin composition containing an ethylene-vinyl alcohol copolymer, a laminate thereof, and a shaped article thereof.

BACKGROUND ART

Ethylene-vinyl alcohol copolymers have excellent gas barrier properties and moreover do not generate toxic gas when disposed by burning as vinyl chloride resins do. Such an ethylene-vinyl alcohol copolymer is thus widely used as a package for foods and beverages, a packing for containers, a medical infusion solution bag, a tire tube, a cushion for shoes, and the like. However, the ethylene-vinyl alcohol copolymer is a relatively hard resin and thus the flexibility is sometimes insufficient depending on the use.

There is a known method of giving various functions to such an ethylene-vinyl alcohol copolymer by containing another resin, and a variety of resin compositions containing the ethylene-vinyl alcohol copolymer and another resin are reported.

Patent Documents 1 and 2 describe a block copolymer having a polymer block mainly comprising vinyl aromatic monomer units and a polymer block mainly comprising isobutylene units, and a polymer composition containing an ethylene-vinyl alcohol-based copolymer. They describe that these polymer compositions are excellent in flexibility and rubber elasticity and also excellent in gas barrier properties. However, when the polymer compositions described in Patent Documents 1 and 2 are produced over a long period of time, the production becomes difficult due to cross-linking of the polymers, causing difficulty in stable production of the polymer composition.

PRIOR ART DOCUMENT

Patent Document

Patent Document 1: JP 10-1579 A
Patent Document 2: JP 10-110086 A

SUMMARY OF THE INVENTION

Problems to be Solved by the Invention

The present invention has been made to solve the above problems, and it is an object thereof to provide a resin composition excellent in gas barrier properties and flexibility and stably produced over a long period of time. It is also an object thereof to provide a laminate and a shaped article using the resin composition.

Means for Solving the Problems

The above problems are solved by providing a resin composition, comprising: an ethylene-vinyl alcohol copolymer (A) (hereinafter, "ethylene-vinyl alcohol copolymer" may be referred to as "EVOH"); an isobutylene-based copolymer (B) containing a halogen atom; and a halogen scavenger (C), wherein a mass ratio (B/A) of the isobutylene-based copolymer (B) to the ethylene-vinyl alcohol copolymer (A) is from 5/95 to 45/55, and a content of the halogen scavenger (C) is from 0.01 to 1 part by mass based on 100 parts by mass of a total of the ethylene-vinyl alcohol copolymer (A) and the isobutylene-based copolymer (B).

In this context, it is preferred that the halogen scavenger (C) is a layered inorganic compound having an exchangeable ion, and it is more preferred that the layered inorganic compound is hydrotalcite. It is also preferred that the halogen atom contained in the isobutylene-based copolymer (B) is a chlorine atom. It is also preferred that the isobutylene-based copolymer (B) is a block copolymer having a polymer block (b1) comprising vinyl aromatic monomer units and a polymer block (b2) comprising isobutylene units.

It is preferred that the resin composition further comprises from 0.0005 to 0.3 part by mass of carboxylic acid metal salt (D) based on 100 parts by mass of a total of the ethylene-vinyl alcohol copolymer (A) and the isobutylene-based copolymer (B).

A preferred embodiment of the present invention is a laminate comprising a layer of the resin composition above. It is preferred that the laminate further comprises a layer of a thermoplastic resin. In this context, it is preferred that the thermoplastic resin is at least one selected from the group consisting of polyethylene, polypropylene, polystyrene, and polyethylene terephthalate. A more preferred embodiment of the present invention is a blow molded container comprising the laminate above. Another more preferred embodiment of the present invention is a thermoformed container comprising the laminate above. Still another more preferred embodiment of the present invention is an inflation film comprising the laminate above. Another preferred embodiment of the present invention is a delaminatable container comprising the laminate above.

Effects of the Invention

The resin composition of the present invention is excellent in gas barrier properties and flexibility and, even when produced over a long period of time, prevents cross-linking of the resin and is thus stably produced. The laminate and the shaped article using the resin composition are excellent in gas barrier properties and flexibility and moreover have a good appearance (appearance with less fish eyes).

MODES FOR CARRYING OUT THE INVENTION

The resin composition of the present invention includes: an ethylene-vinyl alcohol copolymer (A); an isobutylene-based copolymer (B) containing a halogen atom; and a halogen scavenger (C), wherein a mass ratio (B/A) of the isobutylene-based copolymer (B) to the ethylene-vinyl alcohol copolymer (A) is from 5/95 to 45/55, and a content of the halogen scavenger (C) is from 0.01 to 1 part by mass based on 100 parts by mass of a total of the ethylene-vinyl alcohol copolymer (A) and the isobutylene-based copolymer (B).

The EVOH (A) contained in the resin composition of the present invention is a copolymer mainly containing ethylene units and vinyl alcohol units and is produced by saponifying vinyl ester units in an ethylene-vinyl ester copolymer. The EVOH (A) used in the present invention is not particularly limited and may be a known one used for melt molding. One type of the EVOH (A) may be used singly, or two or more types may also be used as a mixture.

The lower limit of the ethylene unit content in the EVOH (A) is preferably 20 mol % and more preferably 24 mol %. When the content is below the lower limit, there is a risk of reducing melt moldability of a resin composition produced therefrom. In contrast, the upper limit of the ethylene unit content in the EVOH (A) is preferably 65 mol %, more preferably 60 mol %, and even more preferably 48 mol %. When the content is more than the upper limit, there is a risk of reducing gas barrier properties of a resin composition produced therefrom.

From the perspective of maintaining the gas barrier properties of a resin composition produced therefrom, the EVOH (A) has a degree of saponification of, but not particularly limited to, preferably 90 mol % or more, more preferably 95 mol % or more, and even more preferably 99 mol % or more.

The EVOH (A) has a melt flow rate (measured by the method according to ASTM D1238 in the conditions at a temperature of 210° C. and under a load of 2160 g, and hereinafter, "melt flow rate" may be referred to as "MFR") with a lower limit of preferably 0.5 g/10 min., more preferably 1.0 g/10 min., and even more preferably 2.0 g/10 min. Meanwhile, the MFR has an upper limit of preferably 100 g/10 min., more preferably 50 g/10 min., and even more preferably 25 g/10 min. When the MFR is in the above range, moldability and workability of a resin composition produced therefrom are improved.

The EVOH (A) may have other constitutional units in addition to the ethylene units, the vinyl alcohol units, and the vinyl ester units. Examples of such other constitutional units include units derived from a vinyl silane compound, such as vinyltrimethoxysilane, vinyltriethoxysilane, vinyl tri((β-methoxy-ethoxy)silane, and γ-methacryloxypropylmethoxysilane. Among them, units derived from vinyltrimethoxysilane or vinyltriethoxysilane are preferred. Further, the EVOH (A) may have units derived from, as long as the objects of the present invention are not impaired, olefins, such as propylene and butylene; unsaturated carboxylic acids and esters thereof, such as (meth)acrylic acid and methyl (meth)acrylate; and vinylpyrrolidones, such as N-vinylpyrrolidone. The content of the units other than the ethylene units, the vinyl alcohol units, and the vinyl ester units is preferably 10 mol % or less and more preferably 5 mol % or less based on the total constitutional units.

As a method of producing the EVOH (A), for example, an ethylene-vinyl ester copolymer is produced in accordance with a known method, followed by saponification to produce the EVOH (A). Such an ethylene-vinyl ester copolymer is produced by polymerizing, for example, ethylene and vinyl ester using a radical polymerization initiator, such as benzoyl peroxide and azobisisobutyronitrile, under pressure in an organic solvent, such as methanol, t-butyl alcohol, and dimethyl sulfoxide. For vinyl ester as a raw material, vinyl acetate, vinyl propionate, vinyl pivalate, and the like may be used, and among them, vinyl acetate is preferred. For saponification of the ethylene-vinyl ester copolymer, an acid catalyst or an alkaline catalyst can be used.

The isobutylene-based copolymer (B) containing a halogen atom contained in the resin composition of the present invention may be a copolymer with an isobutylene unit content of 20 mass % or more, and other copolymerizable monomers are not particularly limited.

Among all, as the isobutylene-based copolymer (B), a block copolymer having a polymer block (b1) comprising vinyl aromatic monomer units and a polymer block (b2) comprising isobutylene units is preferred. By containing such a block copolymer, the flexibility of the resin composition is further improved. The block copolymer may have at least one polymer block (b1) and at least one polymer block (b2) in a molecule and its structure is not particularly limited. For example, the block copolymer may have any molecular chain formation of a linear chain, a branched chain branched into two or more chains, and a star chain. The block copolymer used as the isobutylene-based copolymer (B) is typically a diblock structure represented by b1-b2, a triblock structure represented by b1-b2-b1 or b2-b1-b2, a tetrablock structure represented by b1-b2-b1-b2, a polyblock structure in which totally five or more of b1 and b2 are linearly bonded, or a mixture thereof. One type of the isobutylene-based copolymer (B) may be used singly, or two or more types may also be used as a mixture.

The vinyl aromatic monomer units as a constitutional unit of the polymer block (b1) are units derived from a vinyl aromatic monomer by addition polymerization. As such a vinyl aromatic monomer, those containing no halogen atom are preferred from the perspective of inhibiting cross-linking during production over a long period of time, and examples of the monomer include a vinyl-group containing aromatic compound, such as styrenes, like styrene, α-methylstyrene, 2-methylstyrene, and 4-methylstyrene; and vinylnaphthalenes, like 1-vinylnaphthalene and 2-vinylnaphthalene. The vinyl aromatic monomer units constituting the polymer block (b1) may be one or more types. Among them, the polymer block (b1) preferably comprises styrene units.

From the perspective of improvement in mechanical properties of a resin composition produced therefrom, the polymer block (b1) has a number average molecular weight with a lower limit of preferably 1000 and more preferably 2000. Meanwhile, the polymer block (b1) has a number average molecular weight with an upper limit of preferably 400000 and more preferably 200000. When the number average molecular weight of the polymer block (b1) is in the above range, melt viscosity of the isobutylene-based copolymer (B) does not become too high and the isobutylene-based copolymer is readily mixed with the EVOH (A), and thus moldability and workability of a resin composition produced therefrom are improved.

In the block copolymer used as the isobutylene-based copolymer (B), the isobutylene units as constitutional units of the polymer block (b2) are units ($-C(CH_3)_2-CH_2-$) derived from isobutylene by addition polymerization. The polymer block (b2) preferably has a number average molecular weight with a lower limit of 10000. This causes a resin composition produced therefrom to have particularly good gas barrier properties. Meanwhile, the polymer block (b2) preferably has a number average molecular weight with an upper limit of 400000. When the number average molecular weight of the polymer block (b2) is in the above range, moldability and workability of a resin composition produced therefrom are improved.

The ratio of the polymer block (b1) to the polymer block (b2) contained in the block copolymer used as the isobutylene-based copolymer (B) may be appropriately determined, whereas the lower limit of the content of the polymer block (b1) in the block copolymer is preferably 5 mass %, more preferably 10 mass %, and even more preferably 15 mass % based on the total mass of the isobutylene-based copolymer (B). When the content of the polymer block (b1) is the lower limit or more, mechanical properties, such as strength, of a resin composition produced therefrom is improved. Meanwhile, the upper limit of the content of the polymer block (b1) is preferably 80 mass %, more preferably 70 mass %, and even more preferably 50 mass % based on the total mass of the isobutylene-based copolymer (B). When the content of the polymer block (b1) is the upper limit or less, melt viscosity does not become too high, and thus moldability and workability of a resin composition produced therefrom are improved. When a plurality of polymer blocks (b1) are contained in the isobutylene-based copolymer (B), a total amount of them is defined as the content of the polymer block (b1).

The isobutylene-based copolymer (B) contained in the resin composition of the present invention contains a halogen atom. The halogen atom is considered to be derived from a polymerization catalyst used for production of the isobutylene-based copolymer (B) and is mainly contained in a terminal of the isobutylene-based copolymer (B). Examples of the halogen atom contained in the isobutylene-based copolymer (B) include chlorine, bromine, fluorine, iodine, and the like, and among all, chlorine is often contained. The halogen atom content in the isobutylene-based copolymer (B) is generally from 0.005 to 3.000 mass %. The halogen atoms in the isobutylene-based copolymer (B) can be analyzed using an ion chromatograph.

The isobutylene-based copolymer (B) has a number average molecular weight with a lower limit of preferably 12000 and more preferably 30000. When the number average molecular weight is the lower limit or more, mechanical properties, such as strength and degree of elongation, of a resin composition produced therefrom are improved. Meanwhile, the isobutylene-based copolymer (B) has a number average molecular weight with an upper limit of preferably 600000 and more preferably 400000. When the isobutylene-based copolymer (B) has a number average molecular weight is the upper limit or less, moldability and workability of a resin composition produced therefrom are improved.

The isobutylene-based copolymer (B) has an MFR (measured by the method according to ASTM D1238 in the conditions at a temperature of 230° C. and under a load of 2160 g) with a lower limit of preferably 0.05 g/10 min., more preferably 2.5 g/10 min., and even more preferably 5.0 g/10 min. Meanwhile, the isobutylene-based copolymer (B) has an MFR with an upper limit of preferably 100 g/10 min., more preferably 50 g/10 min., and even more preferably 20 g/10 min. When the MFR is in the above range, moldability and workability of a resin composition produced therefrom are improved.

Further, a functional group may be introduced into the isobutylene-based copolymer (B) by an arbitrary method as long as the effects of the present invention are not impaired. Examples of the functional group that can be introduced include: a hydroxyl group; an amino group; an alkylamino group; ether groups, such as an epoxy group and an alkoxyl group; a carboxyl group; ester groups, such as an alkoxycarbonyl group and an acyloxyl group; amido groups, such as a carbamoyl group, an alkylcarbamoyl group, and an acylamino group; groups having a structure of dicarboxylic anhydride, such as a maleic anhydride residue; and the like.

A method of producing the isobutylene-based copolymer (B) is not particularly limited, but for production of a block copolymer, preferred production methods are those by performing polymerization operation of vinyl aromatic monomers and polymerization operation of isobutylene stepwise in an arbitrary order in an inert solvent using a polymerization initiator. A preferred polymerization initiator used in that case is a combination of Lewis acid and an organic compound capable of generating an activated species for cationic polymerization by the Lewis acid. As such Lewis acid, halogen atom containing compounds are used, such as titanium tetrachloride, tin tetrachloride, boron trichloride, and aluminum chloride. Use of such Lewis acid allows efficient production of the isobutylene-based copolymer (B). When such a halogen atom containing compound is used as the Lewis acid, it is known that the halogen atom is contained in a terminal of the isobutylene-based copolymer (B). As the organic compound capable of generating an activated species for cationic polymerization by the Lewis acid, for example, bis(1-methoxy-1-methylethyl)benzene, bis(1-acetoxy-1-methylethyl)benzene, bis(1-chloro-1-methylethyl)benzene, and the like may be used. As the inert solvent for polymerization, organic solvents, such as hexane, cyclohexane, methylcyclohexane, methyl chloride, and methylene chloride, may be used.

Further, as the method of producing the isobutylene-based copolymer (B), for example, a preferred method comprises adding isobutylene in a reaction system for polymerization using the Lewis acid and the organic compound having one, two, or three functional groups capable of generating an activated species for cationic polymerization in a molecule described above as a polymerization initiator to form the polymer block (b2), followed by polymerization of the vinyl aromatic monomers to form the polymer block (b1).

In the resin composition of the present invention, a mass ratio (B/A) of the isobutylene-based copolymer (B) to the EVOH (A) has to have a lower limit of 5/95, preferably 10/90, and more preferably 15/85. When the mass ratio (B/A) is less than the lower limit, the flexibility of the resin composition is reduced. Meanwhile, the mass ratio (B/A) has to have an upper limit of 45/55, preferably 40/60, and more preferably 35/65. When the mass ratio (B/A) is more than the upper limit, the resin rapidly cross-links during production of the resin composition over a long period of time. In addition, the gas barrier properties of the resin composition are reduced and the number of fish eyes increases in a shaped article produced therefrom.

The halogen scavenger (C) contained in the resin composition of the present invention may have halogen trapping ability, and examples of the halogen scavenger include: a layered inorganic compound having an exchangeable ion; alkaline earth metal compounds, such as magnesium oxide, calcium hydroxide, magnesium hydroxide, and calcium carbonate; zinc oxide; lithium carbonate; and the like.

Among all, the halogen scavenger (C) is preferably a layered inorganic compound having an exchangeable ion. An ion between layers in the layered inorganic compound is exchanged for a halogen ion, and the halogen ion is thus incorporated into the layered inorganic compound. Examples of the layered inorganic compound include: clay mineral; layered polysilicate; layered silicate; layered double hydroxide; layered phosphate; layered transition metal oxysalts, such as titanium niobate, hexaniobate, and molybdate; layered manganate; layered cobalt oxide; and the like, and among all, clay mineral is preferred.

Examples of the clay mineral include hydrotalcite, zeolite, mica, vermiculite, montmorillonite, beidellite, saponite, hectorite, and stevensite. The clay mineral may be synthetic clay or natural clay. Among all, as the clay mineral, hydrotalcite and zeolite are preferred and the former is more preferred. Respective examples of the hydrotalcite and the zeolite include those represented by general formulae (I) and (II) below.

$$Mg_{1-a}Al_a(OH)_2(CO_3)_{a/2} \cdot xH_2O \quad (I)$$

$$Na_2O \cdot Al_2O_3 \cdot 2SiO_2 \cdot yH_2O \quad (II)$$

(In the formulae I and II, x denotes a number from 0 to 5, a denotes a number satisfying $0<a\leq 0.5$, and y denotes a number from 0 to 6.)

In the resin composition of the present invention, the content of the halogen scavenger (C) has to have a lower limit of 0.01 part by mass and preferably 0.025 part by mass based on 100 parts by mass of a total of the EVOH (A) and the isobutylene-based copolymer (B). When the content of the halogen scavenger (C) is less than the lower limit, the resin rapidly cross-links during production of the resin composition over a long period of time. Meanwhile, the content of the halogen scavenger (C) has to have an upper limit of 1 part by mass and preferably 0.8 part by mass based on 100 parts by mass of a total of the EVOH (A) and the isobutylene-based copolymer (B). When the content of the halogen scavenger (C) is more than the upper limit, the number of fish eyes increases in a shaped article produced therefrom and the appearance is impaired.

Containing the halogen scavenger (C) described above is a major characteristic of the resin composition of the present invention. As a result of investigation on the cause of the rapid cross-linking reaction during melt kneading of the EVOH (A) and the isobutylene-based copolymer (B), the present inventors have found that the cause was the halogen atom contained in the isobutylene-based copolymer (B). It is considered that, when a resin composition is produced by melt kneading the EVOH (A) and the isobutylene-based copolymer (B), the halogen atoms in the isobutylene-based copolymer (B) are eliminated to by-produce hydrogen halide and the like and such a by-product accelerates the cross-linking reaction between the EVOH (A) and the isobutylene-based copolymer (B). The present inventors have then found that the cross-linking between the EVOH (A) and the isobutylene-based copolymer (B) is inhibited without increasing fish eyes by containing a predetermined amount of the halogen scavenger (C). Conventionally, addition of a halogen scavenger to an EVOH has been considered to increase fish eyes and impair the appearance of a shaped article produced therefrom, and thus a halogen scavenger has not been added to an EVOH. The effects of the halogen scavenger (C) as described above were first found as a result of the investigation by the present inventors. The cross-link inhibiting effect of the present invention not only inhibits gelation generated in a short time but also inhibits development of cross-linking reaction during production over a long period of time.

In the resin composition of the present invention, the total amount of the EVOH (A), the isobutylene-based copolymer (B), and the halogen scavenger (C) is preferably 50 mass % or more, more preferably 80 mass % or more, and even more preferably 95 mass % or more.

The resin composition of the present invention preferably further comprises carboxylic acid metal salt (D) based on 100 parts by mass of a total of the EVOH (A) and the isobutylene-based copolymer (B). The content of the carboxylic acid metal salt (D) has a lower limit of preferably 0.0005 part by mass and more preferably 0.001 part by mass. The content of the carboxylic acid metal salt (D) being the lower limit or more allows further inhibition of rapid cross-linking between the EVOH (A) and the isobutylene-based copolymer (B) even when the halogen scavenger (C) is contained less in the resin composition. The content of the carboxylic acid metal salt (D) has an upper limit of preferably 0.3 part by mass and more preferably 0.1 part by mass. The content of the carboxylic acid metal salt (D) being the upper limit or less reduces fish eyes derived from the carboxylic acid metal salt (D) in a film produced therefrom. As carboxylic acid constituting the carboxylic acid metal salt (D), carboxylic acid having a carbon number of from 1 to 30 is preferred, and specific examples of the carboxylic acid include acetic acid, stearic acid, lauric acid, montanic acid, behenic acid, octylic acid, sebacic acid, ricinoleic acid, myristic acid, palmitic acid, and the like, and among all, acetic acid and stearic acid are particularly preferred. As metal constituting the carboxylic acid metal salt (D), alkaline earth metal is preferred, and specific examples of the metal include magnesium, calcium, and the like.

From the perspective of thermal stability and viscosity control, the resin composition of the present invention may contain compounds, such as metal salt and acid, other than the carboxylic acid metal salt (D). Such compounds are carboxylic acid, phosphate compounds, boron compounds, and the like, and specific examples of them include the followings. These compounds may be contained in the EVOH (A) or the isobutylene-based copolymer (B) in advance.

Carboxylic acid: oxalic acid, succinic acid, benzoic acid, citric acid, acetic acid, lactic acid, etc.

Phosphate compound: various types of acid, salt thereof, etc., such as phosphoric acid and phosphorous acid Boron compound: boric acids, borate ester, borate, boron hydrides, etc.

The resin composition may contain various types of additives other than above as long as the effects of the present invention are not impaired.

Examples of such additives include an antioxidant, a plasticizer, an ultraviolet absorber, an antistatic agent, a lubricant, a colorant, a filler, a nucleating agent, a flame retardant, a polymer other than the EVOH (A) and the isobutylene-based copolymer (B), and the like. In the resin composition, the content of the components other than the EVOH (A), the isobutylene-based copolymer (B), and the halogen scavenger (C) is preferably 50 mass % or less, more preferably 20 mass % or less, and even more preferably 5 mass % or less.

Examples of the polymer other than the EVOH (A) and the isobutylene-based copolymer (B) contained in the resin composition include: rubber, such as EPR (ethylene-propylene based rubber), EPDM (ethylene-propylene-diene based rubber), NR (natural rubber), isoprene rubber, butadiene rubber, and IIR (butyl rubber); and thermoplastic resins, such as polyethylene, polypropylene, polybutene, polyisobutylene, polyamide, and polyester. The content of the polymer other than the EVOH (A) and the isobutylene-based copolymer (B) contained in the resin composition has an upper limit of preferably 20 mass %, more preferably 10 mass %, and even more preferably 5 mass % based on the total polymer components. Meanwhile, in the resin composition, the total amount of the EVOH (A) and the isobutylene-based copolymer (B) has a lower limit of preferably 80 mass %, more preferably 90 mass %, and even more preferably 95 mass % based on the total polymer components.

A method of preparing the resin composition of the present invention preferably includes, but not particularly limited to, adding the halogen scavenger (C) to the EVOH (A) and the isobutylene-based copolymer (B) and then melt kneading for preparation, and the method is performed using a known mixing apparatus or a known kneading apparatus, such as a kneader-rudder, an extruder, a mixing roll, and a Banbury mixer. The temperature during melt kneading is generally from 110 to 300° C. The halogen scavenger (C) may be contained in the EVOH (A) or the isobutylene-based copolymer (B) in advance.

The resin composition of the present invention may be used as a forming material in an arbitrary form, such as pellets and powder. The resin composition of the present invention is molded into various shaped articles, such as a film, a sheet, a container, a pipe, and fiber. As the molding method, an arbitrary method may be employed, such as blow molding, thermoforming, inflation molding, extrusion molding, injection molding, press molding, calender molding, and vacuum molding, for example. The temperature for melt molding of the resin composition varies depending on the melting point of the EVOH (A) and the like while it is preferably from 150° C. to 270° C., approximately. A shaped article comprising the resin composition of the present invention produced by such a method is excellent in gas barrier properties and flexibility and has a good appearance.

Among all, a laminate having a layer comprising the resin composition of the present invention is a preferred embodiment of the present invention. A laminate having a layer comprising the resin composition and a layer comprising a thermoplastic resin is more preferred. Examples of the thermoplastic resin include: polyolefins, such as polyethylene including high density polyethylene, medium density polyethylene, low density polyethylene, and linear low density polyethylene, an ethylene-propylene copolymer, and polypropylene; polystyrenes (PS); polyesters, such as polyethylene terephthalate; ionomers; ethylene-vinyl acetate copolymers (EVA); ethylene-acrylic ester copolymers (EEA); vinyl chloride resins (PVC); vinylidene chloride resins (PVDC); and the like, and among all, at least one selected from the group consisting of polyethylene, polypropylene, polystyrene, and polyethylene terephthalate is preferred. The thermoplastic resin may be the EVOH (A) or the isobutylene-based copolymer (B).

The laminate may have an adhesive layer interposed between the layer comprising the resin composition of the present invention and the layer comprising another thermoplastic resin. The interposed adhesive layer allows firm bonding integration of the two layers on both sides. Examples of an adhesive used for the adhesive layer include: a diene-based polymer modified with acid anhydride; polyolefin modified with acid anhydride; a mixture of polymer polyol and a polyisocyanate compound; and the like. When the layer comprising a thermoplastic resin is a polyolefin layer, the interlayer adhesion is excellent with no interposed adhesive layer and thus the interposed adhesive layer has less significance.

The layer structure of the laminate includes, but not particularly limited to, the following layer structure examples as a part of the entire layer structure where a layer comprising the resin composition is represented as "a resin composition layer", a layer comprising another thermoplastic resin as T, and an adhesive layer as AD.

Two layers: Resin composition layer/T
Three layers: Resin composition layer/AD/T, T/Resin composition layer/T
  Four layers: T/Resin composition layer/AD/T
  Five layers: T/AD/Resin composition layer/AD/T The laminate of the present invention preferably includes the layer structure of the two layers (Resin composition layer/T) and a delaminatable area between the resin composition layer and the layer comprising another thermoplastic resin is from 170 to 400 cm$^2$. This brings good delamination properties between the resin composition layer and the layer comprising another thermoplastic resin and allows suitable use as a delaminatable container described later. In this context, such another thermoplastic resin is preferably polyolefin.

The delaminatable area in the laminate of the present invention is obtained by the following method. The laminate is cut into 300 mm (width) 350 mm (length), and a delamination port to blow air is produced between the resin composition layer and the layer comprising another thermoplastic resin in a central area of the cut laminate. Not to leak the air to outside, a tube is inserted between the layers from the delamination port by 50 mm long and air is blown at a pressure of 0.2 MPa to delaminate the resin composition layer from the layer comprising another thermoplastic resin. The portion delaminated at this point is cut off and its mass is converted to the area of the delaminated portion to obtain the delaminatable area. If the delaminatable area is less than 170 cm$^2$, there is a risk of causing insufficient delamination properties. The delaminatable area is more preferably 210 cm$^2$ or more and even more preferably 220 cm$^2$ or more. In contrast, when the delaminatable area is more than 400 cm$^2$, there is a risk of causing interlayer disorder while the laminate is molded into a container. The delaminatable area is more preferably 350 cm$^2$ or less and even more preferably 330 cm$^2$ or less. The delaminatable area is larger as the flexibility of the resin composition layer is greater, and is also larger as the adhesion to the layer comprising another thermoplastic resin is lower.

A method of producing the laminate is exemplified by extrusion lamination, dry lamination, coinjection molding, coextrusion molding, and the like but not particularly limited. Examples of the coextrusion molding include coextrusion lamination, coextrusion sheet formation, coextrusion inflation molding, coextrusion blow molding, and the like.

A sheet, a film, parison, or the like of the laminate thus produced may be reheated and uniaxially or biaxially oriented by thermoforming, such as drawing, roll orientation, pantograph orientation, inflation orientation, blow molding, or the like to obtain an oriented shaped article.

The laminate preferably has a thickness of from 50 to 5000 μm. In the laminate, the layer comprising the resin composition of the present invention preferably has a thickness of from 5 to 500 μm and the layer comprising another thermoplastic resin preferably has a thickness of from 45 to 4500 μm.

A blow molded container comprising the laminate is a preferred embodiment of the present invention. Examples of a method of producing such a blow molded container include the following methods.

An example of the method includes so-called direct blow molding, in which, first, using a multilayer extrusion system having at least two extruders, the resin composition of the present invention and another thermoplastic resin are supplied to the separate extruders for separate kneading and melt extrusion, and the layers are extruded to joined in close contact with each other inside a die for molding multilayered parison or outside immediately after discharged from the die to obtain tubular multilayered parison, followed by blow molding the parison in a molten state to obtain a coextruded multilayered container.

As another example, so-called orientation blow molding may be employed in which, using a multilayer injection molding machine having at least two extruders, multilayered parison is obtained by injection molding and then is reheated for blowing. As still another example, orientation blow molding may be employed in which a multilayered pipe is molded by extrusion molding and then cut to an appropriate length, followed by sealing at one end and processing at the other end to allow attachment of a lid, such as a cap, to form a closed end parison, which is reheated and blowed.

As the blow molding method, the known direct blow method or the known orientation blow method may be appropriately selected in accordance with the use. For example, the direct blow method generally offers a low degree of molecule orientation in the resin and thus does not provide high mechanical strength while the method offers good dimensional stability at high temperatures, and is therefore suitable for the use requiring high temperature sterilization. In contrast, the orientation blow method is suitable for the use requiring pressure resistance and creep resistance as a carbonated beverage container. As such another thermoplastic resin, a polyethylene-based resin or a polypropylene-based resin is preferably used for direct blowing, and a saturated polyester-based resin is preferably used for orientation blowing. For production of the blow molded container, the resin composition preferably has an MFR (measured by the method according to ASTM D1238 in the conditions at a temperature of 210° C. and under a load of 2160 g) of from 3.0 to 7.0 g/10 min.

A thermoformed container comprising the laminate is another preferred embodiment of the present invention. The container is produced by heating a film, a sheet, or the like for softening, followed by molding into a mold shape. Examples of the molding method include a method of molding into a mold shape using vacuum or compressed air, and further together with a plug as needed, (straight method, draping process, air slip method, snap back method, plug assist method, etc.), a press molding method, and the like. Various molding conditions, such as a molding temperature, a degree of vacuum, a pressure of compressed air, and a molding speed, are appropriately set depending on the plug shape, the mold shape, properties of the raw material film or sheet, and the like. For production of the thermoformed container, the resin composition preferably has an MFR (measured by the method according to ASTM D1238 in the conditions at a temperature of 210° C. and under a load of 2160 g) of from 1.0 to 6.0 g/10 min.

An inflation film comprising the laminate is still another preferred embodiment of the present invention. The film is obtained by melt kneading raw materials by separate extruders and extruding them from annular dies of at least two layers, and blowing air therein for inflation while cooling. For production of the inflation film, the resin composition preferably has an MFR (measured by the method according to ASTM D1238 in the conditions at a temperature of 210° C. and under a load of 2160 g) of from 0.4 to 4.0 g/10 min.

The laminate of the present invention is excellent in gas barrier properties and flexibility and has a good appearance with a small number of fish eyes, and is thus applicable as household goods, packaging materials, mechanical components, and the like requiring these properties. Examples of the use particularly effectively exhibiting the characteristics of the laminate include a package for foods and beverages, a packing for containers, a medical infusion solution bag, a tire tube, a cushion for shoes, a container, a delaminatable container, an inner bag for a bag in box, an organic liquid storage tank, an organic liquid carrying pipe, a heating hot water pipe (hot water pipe for floor heating, etc.), a geomembrane, a resin wallpaper, and the like. Among them, particularly preferred uses include a package for foods and beverages, a packing for containers, a medical infusion solution bag, a tire tube, and a cushion for shoes.

Among all, a delaminatable container comprising the laminate of the present invention is a more preferred embodiment. As described above, the laminate of the present invention has good delamination properties between the resin composition layer and the layer comprising another thermoplastic resin and has good flexibility while maintaining excellent barrier properties. It is accordingly possible to prevent degradation of an aroma, color, and the like of the contents and to be used suitably as a delaminatable container for foods. In this case, the layer comprising another thermoplastic resin is preferably used as an outer layer.

EXAMPLES

The present invention is more specifically described below with reference to Examples.

[Ethylene Content and Degree of Saponification of EVOH]

They were obtained by $^1$H-NMR measurement using "JNM-GX-500" manufactured by JEOL Ltd. as a measuring device and DMSO-$d_6$ as a solvent.

[Melt Flow Rate (MFR)]

The MFR was obtained by measuring the exit velocity (g/10 min.) of a measurement sample by the method according to ASTM D1238 in predetermined conditions (EVOH: at a temperature of 210° C. under a load of 2160 g; isobutylene-based copolymer: at a temperature of 230° C. under a load of 2160 g) using a melt indexer ("A-111A" manufactured by Toyo Seiki Seisaku-sho, Ltd.).

[Atomic Weight of Chlorine]

The isobutylene-based copolymer (B) was pretreated by a combustion and absorption apparatus ("AQF-2100H" manufactured by Mitsubishi Chemical Analytech Co., Ltd.). The atomic weight of chlorine was detected by measuring the treated liquid thus produced with an ion chromatograph ("ICS-2000" manufactured by Nippon Dionex K.K.).

[EVOH]

A-1: "EVAL F104B" produced by Kuraray Co. Ltd., EVOH
   MFR of 10.0 g/10 min., ethylene content of 32 mol %, degree of saponification of 99.99 mol %

A-2: "EVAL L104B" produced by Kuraray Co. Ltd., EVOH
   MFR of 8.9 g/10 min., ethylene content of 27 mol %, degree of saponification of 99.99 mol %

A-3: "EVAL E105B" produced by Kuraray Co. Ltd., EVOH
   MFR of 13.0 g/10 min., ethylene content of 44 mol %, degree of saponification of 100.0 mol %

A-4: "Novatec LD LJ400" produced by Japan Polyethylene Corp., low density polyethylene
   MFR of 1.5 g/10 min. (190° C., load of 2160 g), density of 0.921 g/cm$^3$

[Isobutylene-Based Copolymer]

B-4: "SIBSTAR 062T" produced by Kaneka Corp., styrene-isobutylene-styrene block copolymer
   MFR of 10 g/10 min. (230° C., load of 2160 g); styrene unit containing polymer block content of 24 mass % with a number average molecular weight of 60000; isobutylene unit containing polymer block content of 77 mass %; chlorine atom content of 0.11 mass %

B-5: "Taftec H1041" produced by Asahi Kasei Corp., styrene-ethylene butylene-styrene block copolymer
   MFR of 5.0 g/10 min.; styrene unit containing polymer block content of 30 mass %; butadiene unit containing polymer block content of 70 mass %; chlorine atom content of 0.00 mass %

[Halogen Scavenger]

C-1: "ZHT-4A" produced by Kyowa Chemical Industry Co., Ltd., hydrotalcite

C-2: "DHT-4A" produced by Kyowa Chemical Industry Co., Ltd., hydrotalcite

[Carboxylic Acid Metal Salt]

D-1: magnesium acetate

D-2: magnesium stearate

D-3: calcium acetate

[Evaluation of Time Until Cross-linking of Resin Composition]

The resin composition was weighed 75 g and put into a roller mixer ("R100" manufactured by Toyo Seiki Seisaku-sho, Ltd.) to be stirred at 230° C. and 100 rpm for temporal observation of change in torque. The time when the torque starts varying up and down continuously by 1 N·m or more was measured.

[Oxygen Transmission Rate (OTR)]

A single layer film was humidity-controlled at 20° C./65% RH, followed by measurement of an oxygen transmission rate (OTR) in accordance with the method described in JIS K 7126 (equal pressure method) in the conditions of 20° C./65% RH using an oxygen transmission rate measurement system ("OX-Tran2/20" manufactured by Modern Controls, Inc., etc.).

[Measurement of Number of Fish Eyes]

During film formation of the single layer film, the number of faults in 0.08 m width×1 m length (0.08 m$^2$) at a drawing speed of 3 m/min. was detected using a fault detector ("FE Counter" manufactured by Frontier System Inc.).

[Evaluation of Flexibility of Single Layer Film]

The single layer film was prepared in the air conditioned in the conditions of 20° C./65% RH for 1 day, followed by being cut into A4 size and flexed 100 times at 5° C. using a Gelbo Flex Tester ("BE-1006-S" manufactured by Tester Sangyo Co. Ltd.). The number of pinholes after flexion was visually counted to be determined as follows.

A: 10 or less
B: 11 or more

[Evaluation of Flexibility of Molded Container]

The body of a molded container was held by one hand and squeezed 100 times at intervals of once in 2 seconds at 23° C. From the appearance of the body of the molded container after that, determination was made as follows.

A: No whitened streaks were found.
B: Streaks (folds) to be the cause of whitened streaks were found.
C: Whitened streaks were found.

[Measurement of Delaminatable Area in Multilayered Film]

Multilayered films produced in Examples 15 to 23 and Comparative Examples 7 to 9 were cut into 300 mm (width)×350 mm (length) and a delamination port to blow air was produced between the resin composition layer and the low density polyethylene layer in a central area of each cut film. Not to leak the air to outside, a tube was inserted between the layers from the delamination port by 50 mm long and air was blown at a pressure of 0.2 MPa to delaminate the resin composition layer from the low density polyethylene layer. The portion delaminated at this point was cut off and its mass was converted to the area of the delaminated portion to obtain the delaminatable area in the multilayered film.

[Bottle Delamination Test]

A delamination port was formed in an outer layer of a body portion of each delaminatable container produced in Examples 15 to 23 and Comparative Examples 7 to 9 and air was injected between the outer layer and an inner layer from the delamination port for delamination. The air was injected at a pressure of 0.3 MPa for 3.0 seconds. The state of the delaminatable container after delamination was visually observed for evaluation by the following criteria.

<Bottle Delamination Properties>

A: The inner bag was squeezed and the whole delaminated.
B: The inner bag was squeezed while undelaminated portions were found partially (particularly in an upper portion) in the delaminatable container.
C: The inner bag was squeezed only partially and only a part of the delaminatable container was delaminated.
D: The inner bag was barely squeezed and the delaminatable container was barely delaminated.

Synthesis Example 1

[Production of Isobutylene-Based Copolymer B-1]

Into a nitrogen-purged reactor with a stirrer, a mixed solvent of 1060 parts by mass of methylene chloride and 920 parts by mass of methylcyclohexene and a polymerization initiator of 2.7 parts by mass of titanium tetrachloride and 0.91 part by mass of 1,4-bis(1-methoxy-1-methylethyl)benzene were charged and cooled at −65° C., followed by charging of 150 parts by mass of isobutylene for polymerization for 4 hours. Further, in the cooling at −65° C., 0.08 parts by mass of dimethylacetamide and 38 parts by mass of styrene were added and polymerized for 4 hours. The reaction mixture thus produced was precipitated with methanol to produce an isobutylene-based copolymer B-1 (styrene-isobutylene-styrene triblock copolymer). The number average molecular weight of B-1 thus produced was obtained by GPC (gel permeation chromatography). The number average molecular weight of each block in the block copolymer was obtained based on the GPC of polyisobutylene as a synthetic intermediate of the block copolymer, and the content of the styrene unit containing polymer block in the block copolymer was obtained by $^1$H-NMR. These analysis results are shown in Table 1.

Synthesis Examples 2 and 3

[Production of Isobutylene-Based Copolymers B-2 and B-3]

Using the method same as Synthesis Example 1 except for changing the charge ratios of styrene, isobutylene, and 1,4-bis(1-methoxy-1-methylethyl)benzene, isobutylene-based copolymer B-2 and isobutylene-based copolymer B-3 (styrene-isobutylene-styrene triblock copolymers) were respectively produced. The results of analysis in the same manner as Synthesis Example 1 are shown in Table 1.

TABLE 1

| Synthesis Example | Number Average Molecular Weight of Isobutylene-Based Copolymer (B) | Number Average Molecular Weight of Polystyrene Block | Number Average Molecular Weight of Polyisobutylene Block | Polystyrene Block Content (mass %) | Chlorine Atom Content (mass %) |
| --- | --- | --- | --- | --- | --- |
| 1 | 25000 | 2500 | 20000 | 20 | 2.8 |
| 2 | 37000 | 5500 | 26000 | 30 | 1.9 |
| 3 | 65000 | 8000 | 49000 | 25 | 1.1 |

Example 1

[Production of Resin Composition]

A-1 was used as the EVOH (A), B-1 was used as the isobutylene-based copolymer (B), and C-1 was used as the halogen scavenger (C). First, A-1 (70 parts by mass) and B-1 (30 parts by mass) were dry blended, and to the mixture thus produced, C-1 (0.3 part by mass) was added and then melt kneaded, followed by pelletization and drying to obtain pellets of the resin composition. The results of evaluation of cross-linking properties of the resin composition thus produced by the above method are shown in Table 2. The melt kneading conditions are described below.

<Melt Kneading Conditions>
Apparatus: 26 mmφ twin screw extruder ("LABO PLASTOMILL 4C150" manufactured by Toyo Seiki Seisaku-sho, Ltd.)
  Screw: co-rotating, fully intermeshing type
  Number of die holes: 2 holes (3 mmφ)
  Extrusion temperature: C1=200° C., C2 to C5=230° C., die=230° C.
  Drying: hot air drying 80° C./6 hr
[Production of Single Layer Film]

The resin composition thus produced was formed into a film in the following conditions to produce a single layer film having a thickness of 20 μm. The evaluation results of the number of fish eyes, the oxygen transmission rate, and the flexibility of the single layer film by the above method are shown in Table 2. The film formation conditions are described below.

<Film Formation Conditions>
Apparatus: 20 mmφ single screw extruder ("LABO PLASTOMILL 4M150" manufactured by Toyo Seiki Seisaku-sho, Ltd.)
  L/D: 20
  Screw: full flight
  Die: 300 mm coat hanger die
  Extrusion temperature: C1=180° C., C2 to C3=220° C., die=220° C.
  Screen: 50/100/50
  Cooling roll temperature: 40° C.

[Production of Molded Container]

The resin composition thus produced, low density polyethylene (LDPE, "Novatec ZE41 K" produced by Japan Polyethylene Corp.), and an adhesive resin ("ADMER LB548" produced by Mitsui Chemicals, Inc.) were formed into a multilayered film in the following conditions to produce a laminate having a thickness of LDPE/adhesive resin/resin composition/adhesive resin/LDPE=400/20/30/20/400 μm. Then, by blow molding using the laminate, a molded container in a cylindrical shape was produced. The results of measuring the flexibility of the molded container by the above method are shown in Table 2. The blow molding conditions are described below.

<Blow Molding Conditions>
Apparatus: direct blow molding machine ("TB-ST-6P" manufactured by Suzuki Tekkousyo)
  Die temperature: 210° C.
  Mold temperature: 50° C.

Examples 2 and 3

In the same manner as Example 1 except for changing the amount of the halogen scavenger (C) as shown in Table 2 and further adding D-1 in the amount shown in Table 2 as the carboxylic acid metal salt (D) while melt kneading the EVOH (A) and the isobutylene-based copolymer (B), each resin composition was produced and evaluated. Using the resin composition thus produced, a single layer film and a molded container were produced and evaluated in the same manner as Example 1. The evaluation results for each are shown in Table 2.

Examples 4 to 12

In the same manner as Example 1 except for changing the type and the amount of the EVOH (A), the isobutylene-based copolymer (B), and the halogen scavenger (C) as shown in Table 2, each resin composition was produced and evaluated. Using the resin composition thus produced, a single layer film and a molded container were produced and evaluated in the same manner as Example 1. The evaluation results for each are shown in Table 2.

Examples 13 and 14

In the same manner as Example 2 except for using D-2 or D-3 as the carboxylic acid metal salt (D), each resin composition was produced and evaluated. Using the resin composition thus produced, a single layer film and a molded container were produced and evaluated in the same manner as Example 1. The evaluation results for each are shown in Table 2.

Comparative Example 1

In the same manner as Example 1 except for not adding the halogen scavenger (C), a resin composition was produced and evaluated. Using the resin composition thus produced, a single layer film and a molded container were produced and evaluated in the same manner as Example 1. The evaluation results are shown in Table 2.

Comparative Example 2

In the same manner as Example 2 except for using A-4 as low density polyethylene instead of the EVOH (A), a resin composition was produced and evaluated. Using the resin composition thus produced, a single layer film and a molded container were produced and evaluated in the same manner as Example 1. Each evaluation result is shown in Table 2.

Comparative Examples 3 to 6

In the same manner as Example 1 except for changing the type and the amount of the EVOH (A), the isobutylene-based copolymer (B), and the halogen scavenger (C) as shown in Table 2, each resin composition was produced and evaluated. Using the resin composition thus produced, a single layer film and a molded container were produced and evaluated in the same manner as Example 1. The evaluation results for each are shown in Table 2.

TABLE 2

| | Example 1 | Example 2 | Example 3 | Example 4 | Example 5 | Example 6 | Example 7 | Example 8 | Example 9 | Example 10 | Example 11 | Example 12 | Example 13 | Example 14 |
|---|---|---|---|---|---|---|---|---|---|---|---|---|---|---|
| EVOH (A) | A-1 | A-1 | A-1 | A-1 | A-2 | A-3 | A-1 | A-1 | A-1 | A-1 | A-1 | A-1 | A-1 | A-1 |
| (parts by mass) | 70 | 70 | 70 | 95 | 70 | 70 | 70 | 70 | 70 | 70 | 70 | 70 | 70 | 70 |
| Isobutylene-Based Copolymer (B) | B-1 | B-1 | B-1 | B-1 | B-1 | B-1 | B-1 | B-1 | B-2 | B-3 | B-4 | B-1 | B-1 | B-1 |
| (parts by mass) | 30 | 30 | 30 | 5 | 30 | 30 | 30 | 30 | 30 | 30 | 30 | 30 | 30 | 30 |

TABLE 2-continued

| Halogen Scavenger (C) | C-1 | C-1 | C-1 | C-1 | C-1 | C-1 | C-1 | C-1 | C-1 | C-1 | C-1 | C-2 | C-1 | C-1 |
|---|---|---|---|---|---|---|---|---|---|---|---|---|---|---|
| (parts by mass) | 0.3 | 0.1 | 0.1 | 0.3 | 0.3 | 0.3 | 1 | 0.1 | 0.3 | 0.3 | 0.3 | 0.3 | 0.1 | 0.1 |
| Carboxylic Acid Metal Salt (D) | — | D-1 | D-1 | — | — | — | — | — | — | — | — | — | D-2 | D-3 |
| (parts by mass) | 0 | 0.0356 | 0.3 | 0 | 0 | 0 | 0 | 0 | 0 | 0 | 0 | 0 | 0.0356 | 0.0356 |
| Evaluation of Time until Cross-Linking (min.) | 76 | 63 | Not Cross-Linked | Not Cross-Linked | 66 | 103 | 85 | 52 | 95 | 134 | 136 | 79 | 58 | 68 |
| Oxygen Transmission Rate [cc · 20 μm/(m$^2$ · day · atm)] | 0.7 | 0.7 | 0.4 | 0.4 | 0.4 | 2.6 | 0.8 | 0.7 | 0.7 | 0.7 | 0.7 | 0.7 | 0.8 | 0.7 |
| Number of Fish Eyes (count/0.08 m$^2$) | 180 | 110 | 326 | 73 | 183 | 164 | 255 | 180 | 189 | 190 | 188 | 190 | 240 | 124 |
| Evaluation of Flexibility of Single Layer Film | A | A | A | B | A | A | A | A | A | A | A | A | A | A |
| Evaluation of Flexibility of Molded Container | A | A | A | B | A | A | A | A | A | A | A | A | A | A |

| | Comparative Example 1 | Comparative Example 2 | Comparative Example 3 | Comparative Example 4 | Comparative Example 5 | Comparative Example 6 |
|---|---|---|---|---|---|---|
| EVOH (A) | A-1 | A-4 | A-1 | A-1 | A-1 | A-1 |
| (parts by mass) | 70 | 70 | 40 | 70 | 70 | 98 |
| Isobutylene-Based Copolymer (B) | B-1 | B-1 | B-1 | B-1 | B-5 | B-1 |
| (parts by mass) | 30 | 30 | 60 | 30 | 30 | 2 |
| Halogen Scavenger (C) | — | C-1 | C-1 | C-1 | C-1 | C-1 |
| (parts by mass) | 0 | 0.1 | 0.3 | 2.0 | 0.3 | 0.1 |
| Carboxylic Acid Metal Salt (D) | — | D-1 | — | — | — | — |
| (parts by mass) | 0 | 0.0356 | 0 | 0 | 0 | 0 |
| Evaluation of Time until Cross-Linking (min.) | 9 | Not Cross-Linked | 13 | 74 | Not Cross-Linked | Not Cross-Linked |
| Oxygen Transmission Rate [cc · 20 μm/(m$^2$ · day · atm)] | 0.7 | >1000 | >1000 | 1.0 | 0.9 | 0.4 |
| Number of Fish Eyes (count/0.08 m$^2$) | 174 | 43 | 469 | 513 | 98 | 71 |
| Evaluation of Flexibility of Single Layer Film | A | A | A | A | C | C |
| Evaluation of Flexibility of Molded Container | A | A | B | B | C | C |

In the resin compositions of the present invention (Examples 1 to 14), rapid torque variation was not observed even when they were melt kneaded over a long period of time, and the cross-linking of the resin was inhibited. The films produced by molding these resin compositions were excellent in flexibility and gas barrier properties and had a good appearance with fewer fish eyes. In contrast, in the resin composition not containing the halogen scavenger (C) (Comparative Example 1), rapid cross-linking of the resin was affirmed from the torque variation in a short time during melt kneading. In the resin composition using low density polyethylene instead of the EVOH (A) (Comparative Example 2), the gas barrier properties were insufficient. In the resin composition with a mass ratio (B/A) of the isobutylene-based copolymer (B) to the EVOH (A) of more than 45/55 (Comparative Example 3), rapid cross-linking of the resin was affirmed from the torque variation in a short time during melt kneading. The film produced by molding the resin composition had insufficient gas barrier properties and had a poor appearance with more fish eyes. The film produced by molding the resin composition having more than 1 part by mass of the halogen scavenger (C) content (Comparative Example 4) had a poor appearance with more fish eyes. The film and the molded container produced by molding the resin composition using the resin not containing chlorine atoms (Comparative Example 5) had worse flexibility due to the resin not reacted with the EVOH (A). The film and the molded container produced by molding the resin composition having less than 5 parts by mass of the isobutylene-based copolymer (B) content (Comparative Example 6) had worse flexibility.

Example 15

In the same manner as Example 1 except for changing the type and the amount of the EVOH (A), the isobutylene-based copolymer (B), the halogen scavenger (C), and the carboxylic acid metal salt (D) as shown in Table 3, pellets and a single layer film of the resin composition were produced and the oxygen transmission rate was measured. The measurement results are shown in Table 3.
[Production of Multilayered Film]
Using the resin composition pellets thus produced, low density polyethylene (LDPE: "LJ400" produced by Novatec), and an adhesive resin ("Modic L553" produced by Mitsubishi Chemical Corp., hereinafter, abbreviated as Ad), a three-material, four-layered multilayered film (LDPE/Resin composition/Ad/LDPE=thickness of 110 μm/20 μm/10 μm/100 μm) was continuously produced by an extruder in the method and the conditions below, followed by measurement of a delaminatable area in accordance with the method described above. The measurement result is shown in Table 3.
<Film Formation Conditions>
[Extruder]
For EVOH: 20 mmφ extruder, labo machine, model ME, CO-EXT (manufactured by Toyo Seiki Seisaku-sho, Ltd.)
For Ad: 20 mmφ extruder, SZW20GT-20MG-STD (manufactured by Technovel Corp.)
For LDPE: 32 mmφ extruder, GT-32-A (manufactured by Research Laboratory of Plastics Technology Co., Ltd.)
[EVOH Extrusion Temperature]
Feeding unit/compression unit/weighing unit/die=180/210/220/220° C.
[Ad Extrusion Temperature]
Feeding unit/compression unit/weighing unit/die=170/210/220/220° C.
[LDPE Extrusion Temperature]
Feeding unit/compression unit/weighing unit/die=170/210/220/220° C.
[Die]
300 mm width coat hanger die (manufactured by Research Laboratory of Plastics Technology Co., Ltd.)
[Production of Delaminatable Container]
Using the resin composition pellets thus produced, a delaminatable container having a body portion and an outlet was produced by blow molding in the following conditions and was subjected to bottle delamination test in accordance with the method described above for evaluation. The evaluation results are shown in Table 3.
(1) Container Shape
Body portion: diameter of 47 mm, height of 110 mm
Outlet: diameter of 30 mm, height of 16 mm
(2) Layer Structure
Outer layer: polypropylene (model: FSX16E9, produced by Sumitomo Chemical Co., Ltd.)
Inner layer: 3-layer structure of resin composition layer/adhesive layer/inner surface layer in order from outer layer
Adhesive layer: adhesive component (model: MODIC L522, produced by Mitsubishi Chemical Corp.): LLDPE (model: HARMOREX F325N, produced by Japan Polyethylene Corp.)=1:1
Inner surface layer: LLDPE (model: HARMOREX F325N, produced by Japan Polyethylene Corp.)
(3) Blow Molding Conditions
Each molten resin was coextruded to have the above layer structure, thereby producing laminated parison in a molten state and the laminated parison in a molten state was set in a blow molding mold and molded in a desired container shape by blow molding. The coextrusion conditions were controlled to have both thicknesses of the outer layer and the inner layer ranging from 70 to 130 μm and to have a ratio of the thicknesses of outer layer/inner layer from 0.8 to 1.3. The blow molding conditions were provided as blow pressure: 0.4 MPa, mold temperature: 25° C., and blowing time: 15 seconds.

Examples 16 to 23 and Comparative Examples 7 to 9

In the same manner as Example 15 except for changing the type and the amount of the EVOH (A), the isobutylene-based copolymer (B), the halogen scavenger (C), and the carboxylic acid metal salt (D) as shown in Table 3, a single layer film, a multilayered film, and a multilayered delaminatable container for each were produced and evaluated. The results are shown in Table 3.

TABLE 3

|  |  | Example 15 | Example 16 | Example 17 | Example 18 | Example 19 | Example 20 | Example 21 | Example 22 | Example 23 |
|---|---|---|---|---|---|---|---|---|---|---|
| EVOH(A) | Type | A-2 | A-2 | A-2 | A-3 | A-3 | A-1 | A-2 | A-2 | A-2 |
|  | Ethylene Content (mol %) | 27 | 27 | 27 | 44 | 44 | 32 | 27 | 27 | 27 |
|  | parts by mass | 90 | 80 | 70 | 80 | 70 | 70 | 80 | 80 | 80 |
| Isobutylene-Based Copolymer (B) | Type | B-1 | B-1 | B-1 | B-1 | B-1 | B-1 | B-1 | B-1 | B-1 |
|  | parts by mass | 10 | 20 | 30 | 20 | 30 | 30 | 20 | 20 | 20 |
| Halogen Scavenger (C) | Type | C-1 | C-1 | C-1 | C-1 | C-1 | C-1 | C-1 | C-1 | C-1 |
|  | parts by mass | 0.1 | 0.1 | 0.1 | 0.1 | 0.1 | 0.1 | 0.3 | 0.05 | 0.1 |
| Carboxylic Acid Metal Salt (D) | Type | — | — | — | — | — | — | — | — | D-2 |
|  | parts by mass | 0 | 0 | 0 | 0 | 0 | 0 | 0 | 0 | 0.0356 |

TABLE 3-continued

| | | | | | | | | | |
|---|---|---|---|---|---|---|---|---|---|
| Oxygen Transmission Rate [cc · 20 μm/(m² · day · atm)] | 0.2 | 0.2 | 0.4 | 2.2 | 2.6 | 0.7 | 0.2 | 0.2 | 0.2 |
| Delaminatable Area (cm²) | 218 | 228 | 242 | 325 | 275 | 305 | 225 | 201 | 228 |
| Bottle Delamination | B | A | B | A | A | A | B | C | A |

| | | Comparative Example 7 | Comparative Example 8 | Comparative Example 9 |
|---|---|---|---|---|
| EVOH(A) | Type | A-2 | A-2 | A-2 |
| | Ethylene Content (mol %) | 27 | 27 | 27 |
| | parts by mass | 80 | 97 | 40 |
| Isobutylene-Based Copolymer (B) | Type | B-1 | B-1 | B-1 |
| | parts by mass | 20 | 3 | 60 |
| Halogen Scavenger (C) | Type | C-1 | C-1 | C-1 |
| | parts by mass | 0 | 0.1 | 0.1 |
| Carboxylic Acid Metal Salt (D) | Type | — | — | — |
| | parts by mass | 0 | 0 | 0 |
| Oxygen Transmission Rate [cc · 20 μm/(m² · day · atm)] | | 0.2 | 0.2 | 0.7 |
| Delaminatable Area (cm²) | | 165 | 232 | 198 |
| Bottle Delamination | | D | D | D |

The invention claimed is:

1. A resin composition, comprising:
an ethylene-vinyl alcohol copolymer (A);
an isobutylene-based copolymer (B) comprising a halogen atom;
a halogen scavenger (C); and
an acetic acid metal salt (D),
wherein
a mass ratio (B/A) of the isobutylene-based copolymer (B) to the ethylene-vinyl alcohol copolymer (A) is in a range from 5/95 to 45/55,
a content of the halogen scavenger (C) is from 0.025 to 0.8 part by mass based on 100 parts by mass of a total of the ethylene-vinyl alcohol copolymer (A) and the isobutylene-based copolymer (B), and
a content of the acetic acid metal salt (D) is from 0.0005 to 0.1 part by mass based on 100 parts by mass of a total of the ethylene-vinyl alcohol copolymer (A) and the isobutylene-based copolymer (B).

2. The resin composition according to claim 1, wherein the halogen scavenger (C) is a layered inorganic compound having an exchangeable ion.

3. The resin composition according to claim 2, wherein the layered inorganic compound is hydrotalcite.

4. The resin composition according to claim 1, wherein the halogen atom in the isobutylene-based copolymer (B) is a chlorine atom.

5. The resin composition according to claim 1, wherein the isobutylene-based copolymer (B) is a block copolymer having a polymer block (b1) comprising vinyl aromatic monomer units and a polymer block (b2) comprising isobutylene units.

6. The resin composition according to claim 1, further comprising from 0.001 to 0.1 part by mass of carboxylic acid metal salt (D) based on 100 parts by mass of a total of the ethylene-vinyl alcohol copolymer (A) and the isobutylene-based copolymer (B).

7. A laminate, comprising a layer of the resin composition according to claim 1.

8. The laminate according to claim 7, further comprising a layer of a thermoplastic resin.

9. The laminate according to claim 8, wherein the thermoplastic resin is at least one selected from the group consisting of polyethylene, polypropylene, polystyrene, and polyethylene terephthalate.

10. A blow molded container, comprising the laminate according to claim 7.

11. A thermoformed container, comprising the laminate according to claim 7.

12. An inflation film, comprising the laminate according to claim 7.

13. A delaminatable container, comprising the laminate according to claim 7.

* * * * *